United States Patent [19]

Rogers

[11] 4,000,826
[45] Jan. 4, 1977

[54] CRYOGENIC TRANSPORT

[76] Inventor: Thelmer A. Rogers, P.O. Drawer 1589, Lubbock, Tex. 79408

[22] Filed: Oct. 17, 1975

[21] Appl. No.: 623,378

[52] U.S. Cl. .................................. 220/3; 62/45; 62/239; 220/9 C; 220/9 LG; 280/5 G

[51] Int. Cl.² .......................................... F17C 1/12

[58] Field of Search .......... 280/5 G; 105/357, 358; 220/9 LG, 15, 63 R, 3, 9 C; 62/45, 239, 55

[56] References Cited

UNITED STATES PATENTS

| 883,479 | 3/1908 | Place .............................. 220/9 LG |
| 2,925,934 | 2/1960 | Hampton et al. .................... 220/15 |
| 3,037,657 | 6/1962 | Hampton et al. .................... 220/15 |
| 3,156,100 | 11/1964 | Haettinger et al. ................. 220/15 |
| 3,168,362 | 2/1965 | Perkins ............................ 62/45 X |
| 3,306,059 | 2/1967 | Stelts et al. ..................... 62/45 |
| 3,321,159 | 5/1967 | Jackson ........................... 62/45 X |

*Primary Examiner*—William F. O'Dea
*Assistant Examiner*—Ronald C. Capossela
*Attorney, Agent, or Firm*—Wendell Coffee

[57] ABSTRACT

A structural tank for carrying cold fluids includes a cylindrical portion and hemispherical heads. The tank is horizontally structurally supported by the heads. The cylindrical portion carries an outside vacuum insulation shell and a vacuum insulation shell is placed inside of the structural heads.

6 Claims, 1 Drawing Figure

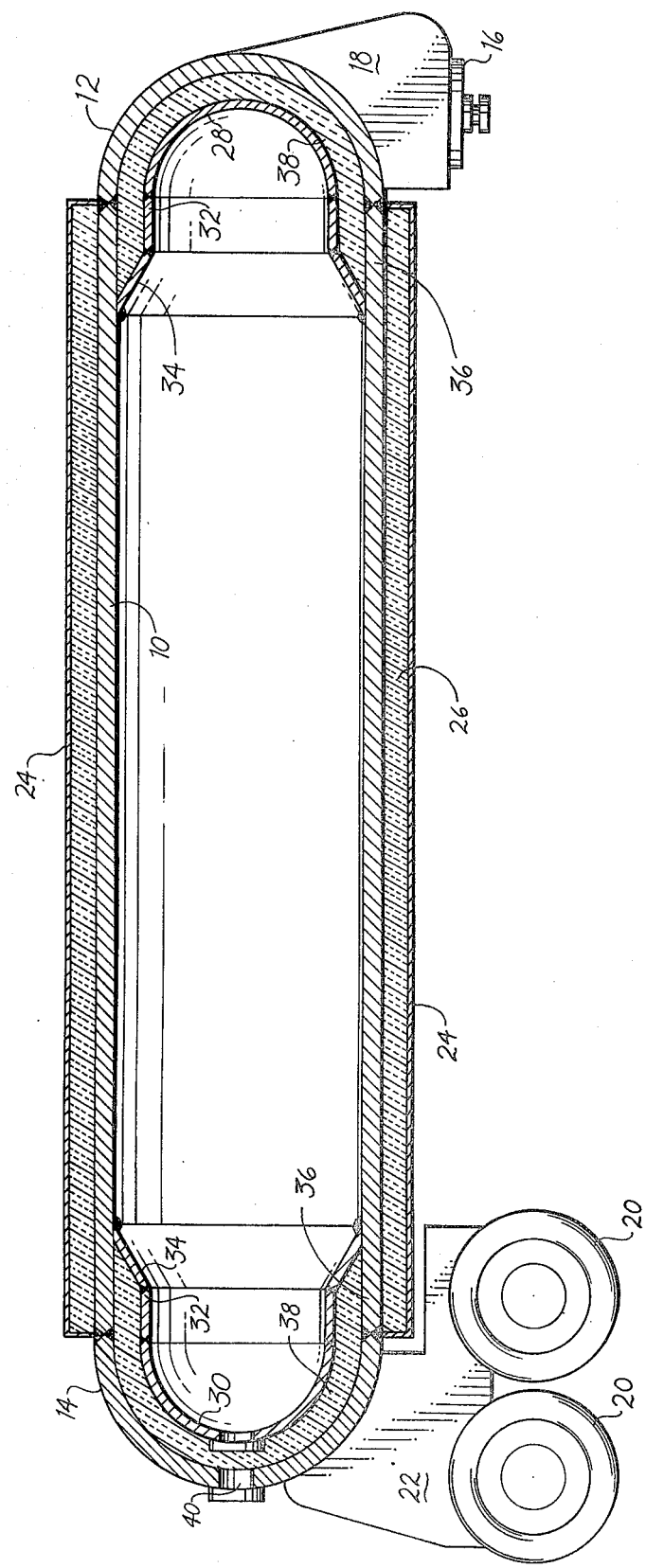

CRYOGENIC TRANSPORT

BACKGROUND OF THE INVENTION

1. Field of the Invention

This invention relates to a metalic receptacle carrying cold liquified gas having a vacuum between a spaced jacket and the tank.

2. Description of the Prior Art

In common practice today, cryogenic fluids such as liquified natural gas or liquified nitrogen are transported cold in a tank. The tank has an outer shell or jacket. Traditionally these are carried horizontally and, therefore, the inner tank must not only have the strength to withstand the pressure of the fluid which it carries, but also it must have the strength to support itself between the supports. Commonly these tanks are transported by truck and are self supporting, i.e., a fifth-wheel rub plate is attached to one end and the tandum support attached to the other, the tank itself providing the sole support between the front and back.

In commercial practice today the fifth-wheel rub plate and tandum supports are both connected to the outer shell. The space between the outer shell and the inner shell is filled with insulation material and the air evacuated to form a vacuum insulation space between the outer shell or jacket and the inner structural shell. The outer shell is not thick.

Trouble is experienced in the cracking of the outer shell because of the structural strain placed thereon inasmuch as the structural supports at each end are attached to the outer shell. Once the outer shell is cracked, of course, the vacuum is spoiled and, therefore, the insulation is no longer effective.

SUMMARY OF THE INVENTION

New and Different Function

I have invented a better way to support these tanks. According to my invention the structural supports at each end are attached to the heavy heads which are attached to the main support shell. The tank between the supports is insulated in the traditional way of attaching a vacuum shell or jacket around it. However, the heads are insulated by placing a false head or an inner vacuum head inside of the structural heads and forming the insulation space between the inner head and the structural head. It is necessary to overlap the two insulating spaces and, of course, there will be some heat loss along the structural shell traveling lengthwise of the metal of the structural shell.

I provide three separate vacuum spaces, thus a leak in any one is not as serious as within a sole vacuum space.

OBJECTS OF THE INVENTION

An object of this invention is to transport cryogenic fluids.

Other objects are to achieve the above with a device that is sturdy, compact, durable, simple, safe, efficient, versatile, and reliable, yet and easy to manufacture, and maintain.

Further objects are to achieve the above with a method that is versatile, rapid, efficient, and inexpensive, and does not require skilled people to maintain.

The specific nature of the invention, as well as other objects, uses, and advantages thereof, will clearly appear from the following description and from the accompanying drawing, which is not to scale.

BRIEF DESCRIPTION OF THE DRAWING

The drawing is a sectional view, somewhat schematic, of a cryogenic transport tank according to my invention.

DESCRIPTION OF THE PREFERRED EMBODIMENT

Referring more particularly to the drawing, there may be seen a transport having a tank with a cylindrical shell 10. As illustrated, the cylindrical structured shell 10 has sufficient thickness and strength to contain the cryogenic fluid and also to support the weight of it and the tank between its ends. The shell 10 has front hemispherical structural 12 in front and rear hemispherical structural head 14 at the rear.

Fifth-wheel rub plate 16 is attached to the front structural head 12 by structure, which is well known to those skilled in the tank transport arts. Rear tandum wheels 20 are attached to the rear structural head 14 by structure 22 likewise well known to the truck tank transport arts.

The cylindrical shell 10 between the front structure 18 and the rear structure 22 is jacket by vacuum corrigated shell 24, thus forming an insulation space 26 between the structural shell 10 and the vacuum shell 24. The vacuum space 26 may be filled with certain insulation material to maintain the vacuum shell spaced from the structure shell as is well known to the art and, once having been sealed, it is evacuated forming a vacuum for insulation purposes. The use of vacuum jacketed tanks for insulation is well known to those skilled in this art, therefore, will not be described here in detail.

Within the tank, front vacuum head 28 is sealed to the structural shell 10 at the front and rear vacuum head 30 is sealed to the structural shell 10 in the rear. As may be seen in the drawing, there is a cylindrical section 32 adjacent to each of the heads 28 and 30 and sealed thereto followed by a conic section 34.

Still referring to the drawing, it may be seen that there is a section 36 of the structural shell 10 which has an insulation space 26 on the outside thereof and insulation space 38 on the inside thereof. The insulation space 38 being that space between the inner false heads 28 and 30 and the outer structural heads 12 and 14. Section 36 with double insulation needs to be long in relationship to the thickness of insulation. I.e., there will be some heat that will travel from the hot structural heads 12 and 14 lengthwise through the metal of the structural shell 10 to within the area where it has the inner conic section 34. Obviously, the longer this length 36 is the less heat loss there will be, however, those skilled in the art will also recognize that there will be a greater expense in the cost of manufacture the longer this space is made. The rear structural head 14 and the rear vacuum head 30 are provided with opening 40 through which extend the standard gauges, fill lines, relief valves, etc., all as known to the art and, therefore, neither shown nor described. A bellows extends between the heads around the opening 40 as is known.

It will be understood, of course, that such a tank could also be supported by two supports on a railway truck as well as a trailer behind a highway tractor or adapted for any other transport such as shipboard.

Thus, it may be seen that I have provided an improved cryogenic fluid transport.

As an aid to correlating the terms of the claims to the exemplary drawing, the following catalog of elements is provided:

| | |
|---|---|
| 10 structural shell | 26 insulation space |
| 12 front structural head | 28 front vacuum head |
| 14 rear structural head | 30 rear vacuum head |
| 16 rub plate | 32 cylindrical section |
| 18 front structure | 34 conic section |
| 20 tandum wheels | 36 length |
| 22 structure, rear | 28 insulation space |
| 24 vacuum shell | 40 opening |

The embodiment shown and described above is only exemplary. I do not claim to have invented all parts, elements or steps described. Various modifications can be made in the construction, material, arrangement, and operation, and still be within the scope of my invention. The limits of the invention and the bounds of the patent protection are measured by and defined in the following claims. The restrictive description and drawing of the specific example above do not point out what an infringement of this patent would be, but are to enable the reader to make and use the invention.

SUBJECT MATTER CLAIMED FOR PROTECTION

I claim as my invention:
1. An insulated tank for transporting cryogenic fluids comprising:
 a. a cylindrical support and pressure shell with
 b. a support head attached by structure and sealing weld at each end,
 c. support structure on each head for mounting said tank for transportation,
 d. an outer insulating shell over and spaced from the cylindrical support and pressure shell, and
 e. an inner insulating head within and spaced from each support head,
 f. the outer insulating shell sealed to the structural and pressure shell to provide an insulation space therebetween, and
 g. each of the inner insulating heads sealed to the structural shell to provide insulation spaces between the structural and insulation heads.

2. The invention as defined in claim 1 with an additional limitation of said seal of the insulation shell and seal of each insulation head overlapping so that the cylindrical structural shell adjacent the structural head has a double insulation space, that is, both the inside and outside thereof.

3. The invention as defined in claim 2 wherein the length of the structural shell having a double insulation space is at lease twice the thickness of either insulation space.

4. The invention as defined in claim 1 wherein each of the three insulation spaces is evacuated, thus forming vacuum insulation spaces.

5. The invention as defined in claim 4 with an additional limitation of said seal of the insulation shell and seal of each insulation head overlapping so that the cylindrical structural shell adjacent the structural head has a double insulation space, that is, both the inside and outside thereof.

6. The invention as defined in claim 5 wherein the length of the structural shell having a double insulation space is at least twice the thickness of either insulation space.

* * * * *